US010809995B2

(12) United States Patent
Hussein et al.

(10) Patent No.: US 10,809,995 B2
(45) Date of Patent: *Oct. 20, 2020

(54) INTERNET-OF-THINGS DEVICE BLANK

(71) Applicant: Intel Corporation, Santa Clara, CA (US)

(72) Inventors: Atif Hussein, Mountain View, CA (US); Trina Ward, Los Altos, CA (US); Patricia Robb, Crystal Lake, IL (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/390,242

(22) Filed: Apr. 22, 2019

(65) Prior Publication Data

US 2019/0384584 A1 Dec. 19, 2019

Related U.S. Application Data

(63) Continuation of application No. 15/085,593, filed on Mar. 30, 2016, now Pat. No. 10,310,832.

(Continued)

(51) Int. Cl.
G06F 9/44 (2018.01)
G06F 8/61 (2018.01)
(Continued)

(52) U.S. Cl.
CPC ............... G06F 8/61 (2013.01); H04L 67/10 (2013.01); H04L 67/12 (2013.01); H04L 67/34 (2013.01); G06F 8/65 (2013.01)

(58) Field of Classification Search
CPC ................... G06F 8/65; G06F 9/546
See application file for complete search history.

(56) References Cited

U.S. PATENT DOCUMENTS 9,800,468 B2 10/2017 Smith et al.
10,310,832 B2 6/2019 Hussein et al.
(Continued)

FOREIGN PATENT DOCUMENTS

CN 108781224 11/2018
CN 109479067 3/2019
(Continued)

OTHER PUBLICATIONS

"U.S. Appl. No. 15/085,639, Non Final Office Action dated Oct. 15, 2019", 12 pgs.
(Continued)

Primary Examiner — Duy Khuong T Nguyen
(74) Attorney, Agent, or Firm — Schwegman Lundberg & Woessner, P.A.

(57) ABSTRACT

System and techniques for an internet-of-things device blank are described herein. An IoT blank device may be tested to determine whether it is in an initial state. In response to a determination that the IoT blank device is in the initial state, a cloud endpoint may be contacted, via a transceiver, to retrieve a package. Here, the contact includes a message with an identifier of the IoT blank device. The package may be received, the package including an application. The package may be installed. The installation including registering the application with a message queue of the IoT blank device. The application may also be run after installation. Data from the application running on the IoT blank device may be received via a message queue. The data may then be transmitted to the cloud endpoint via the transceiver of the IoT blank device.

25 Claims, 9 Drawing Sheets

Related U.S. Application Data

(60) Provisional application No. 62/297,316, filed on Feb. 19, 2016.

(51) Int. Cl.
*H04L 29/08* (2006.01)
*G06F 8/65* (2018.01)

(56) References Cited

U.S. PATENT DOCUMENTS

| | | | |
|---|---|---|---|
| 2002/0092014 | A1 | 7/2002 | Shibusawa et al. |
| 2003/0126468 | A1 | 7/2003 | Markham |
| 2007/0169084 | A1 | 7/2007 | Frank et al. |
| 2010/0265172 | A1 | 10/2010 | Sadahiro |
| 2011/0053585 | A1* | 3/2011 | Otonari ............... H04L 1/0026 455/422.1 |
| 2011/0161929 | A1 | 6/2011 | Keating |
| 2012/0155645 | A1 | 6/2012 | Prochaska et al. |
| 2014/0094122 | A1 | 4/2014 | Etemad et al. |
| 2014/0109187 | A1 | 4/2014 | Rados |
| 2015/0156266 | A1 | 6/2015 | Gupta |
| 2015/0163121 | A1* | 6/2015 | Mahaffey ............ G06F 11/0709 707/687 |
| 2015/0347114 | A1 | 12/2015 | Yoon |
| 2016/0088534 | A1* | 3/2016 | Axmon ................. H04W 24/10 370/252 |
| 2016/0196131 | A1 | 7/2016 | Searle et al. |
| 2016/0241439 | A1 | 8/2016 | Idnani et al. |
| 2016/0308957 | A1 | 10/2016 | Zhang et al. |
| 2017/0003956 | A1 | 1/2017 | Chang |
| 2017/0006135 | A1 | 1/2017 | Siebel et al. |
| 2017/0187807 | A1 | 6/2017 | Clernon |
| 2017/0195424 | A1 | 7/2017 | Nasir et al. |
| 2017/0242674 | A1 | 8/2017 | Hussein et al. |
| 2017/0244600 | A1 | 8/2017 | Hussein et al. |
| 2017/0322790 | A1* | 11/2017 | Surdu ..................... G06F 8/654 |
| 2018/0285086 | A1* | 10/2018 | O'Malley ............. H04L 67/303 |
| 2018/0359621 | A1 | 12/2018 | Singhal et al. |

FOREIGN PATENT DOCUMENTS

| | | |
|---|---|---|
| KR | 1020100072978 | 7/2010 |
| KR | 1020150009720 | 1/2015 |
| KR | 101521616 | 5/2015 |
| KR | 1020160005828 | 1/2016 |
| KR | 1020160011090 | 1/2016 |
| WO | 2010111148 | 9/2010 |
| WO | 2015149531 | 10/2015 |
| WO | 2017143227 | 8/2017 |
| WO | 2017143238 | 8/2017 |

OTHER PUBLICATIONS

"European Application Serial No. 17753949.1, Response filed Oct. 15, 2019 to Extended European Search Report dated Sep. 12, 2019", left the receipt in the PDF because of 1-day discrepancy between draft date and filing date of the response, 16 pgs.
"European Application Serial No. 17753949.1, Communication Pursuant to Article 94(3) EPC dated Dec. 20, 2019", 9 pgs.
"U.S. Appl. No. 15/085,593, Non Final Office Action dated Apr. 12, 2017", 54 pgs.
"International Application Serial No. PCT US2017 018429, International Search Report dated May 24, 2017", 3 pgs.
"International Application Serial No. PCT US2017 018429, Written Opinion dated May 24, 2017", 8 pgs.
"International Application Serial No. PCT US2017 018446, International Search Report dated May 19, 2017", 3 pgs.
"International Application Serial No. PCT US2017 018446, Written Opinion dated May 19, 2017", 6 pgs.
"U.S. Appl. No. 15/085,593, Response filed Jul. 12, 2017 to Non Final Office Action dated Apr. 12, 2017", 11 pgs.
"U.S. Appl. No. 15/085,593, Final Office Action dated Oct. 10, 2017", 63 pgs.
"U.S. Appl. No. 15/085,639, Non Final Office Action dated Dec. 15, 2017", 12 pgs.
"U.S. Appl. No. 15/085,593, Response filed Jan. 9, 2018 to Final Office Action dated Oct. 10, 2017", 12 pgs.
"U.S. Appl. No. 15/085,593, Advisory Action dated Jan. 19, 2018", 3 pgs.
"U.S. Appl. No. 15/085,593, Non Final Office Action dated May 30, 2018", 71 pgs.
"International Application Serial No. PCT US2017 018429, International Preliminary Report on Patentability dated Aug. 30, 2018", 10 pgs.
"International Application Serial No. PCT US2017 018446, International Preliminary Report on Patentability dated Aug. 30, 2018", 8 pgs.
"Chinese Application Serial No. 201780012048.6, Notification on Correction of Deficiencies dated Aug. 31, 2018", w English translation, 2 pgs.
"U.S. Appl. No. 15/085,593, Response filed Aug. 29, 2018 to Non Final Office Action dated May 30, 2018", 13 pgs.
"U.S. Appl. No. 15/085,593, Notice of Allowance dated Jan. 22, 2019", 11 pgs.
"U.S. Appl. No. 15/085,639, Non Final Office Action dated Mar. 1, 2019", 12 pgs.
"U.S. Appl. No. 15/085,639, Response filed Jul. 1, 2019 to Non-Final Office Action dated Mar. 1, 2019", 8 pgs.
"European Application Serial No. 17753949.1, Extended European Search Report dated Sep. 12, 2019", 11 pgs.
"Internet of things", Wikipedia, Retrieved from the Internet:URL:https : en.wi kipedia.org w i ndex.php?title=Internet_of_thingsandoldid= 705658879[retrieved on Sep. 2, 2019], (Feb. 18, 2016), 19 pgs.
"Constrained Application Protocol", Wikipedia, Retrieved from the Internet:URL:https: en.wi kipedia.org w index.php?title= Constrained Application Protocolandoldid=699942379[retrieved on Sep. 2, 2019], (Jan. 15, 2016), 4 pgs.
"Installation (Computer Programs)", Wikipedia, Retrieved from the Internet:URL:https: en.wi kipedia.org w index.php?title= Installation (computer programs)andoldid=702926357[retrieved on Sep. 2, 2019], (Feb. 2, 2016), 6 pgs.
"U.S. Appl. No. 15/085,639, Final Office Action dated Feb. 13, 2020", 13 pgs.
"U.S. Appl. No. 15/085,639, Response filed Jan. 14, 2020 to Non Final Office Action dated Oct. 15, 2019", 8 pgs.
"U.S. Appl. No. 15/085,639, Response filed Apr. 13, 2020 to Final Office Action dated Feb. 13, 2020", 10 pgs.
"European Application Serial No. 17753949.1, Response filed Mar. 19, 2020 to Communication Pursuant to Article 94(3) EPC dated Dec. 20, 2019", 14 pgs.
"U.S. Appl. No. 15/085,639, Advisory Action dated May 12, 2020", 4 pgs.

* cited by examiner

INTERNET-OF-THINGS DEVICE BLANK

CLAIM OF PRIORITY

This patent application is a continuation of U.S. Serial application Ser. No. 15/085,593, filed Mar. 30, 2016, which claims the benefit of priority of U.S. Provisional Application Ser. No. 62/297,316, titled "INTERNET-OF-THINGS DEVICE BLANK" and filed on Feb. 19, 2016, all of which are hereby incorporated by reference herein in their entirety.

TECHNICAL FIELD

Embodiments described herein generally relate to mobile devices and more specifically to an internet-of-things (IoT) device blank.

BACKGROUND

IoT devices are physical objects that may communicate on a network and often include sensors to sample environmental conditions. Typically, these are low-powered devices that are embedded or attached to everyday things, such as buildings, vehicles, packages, etc., to provide an additional level of artificial sensory perception of those things. Recently, IoT devices have become more popular and thus applications using these devices have proliferated.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
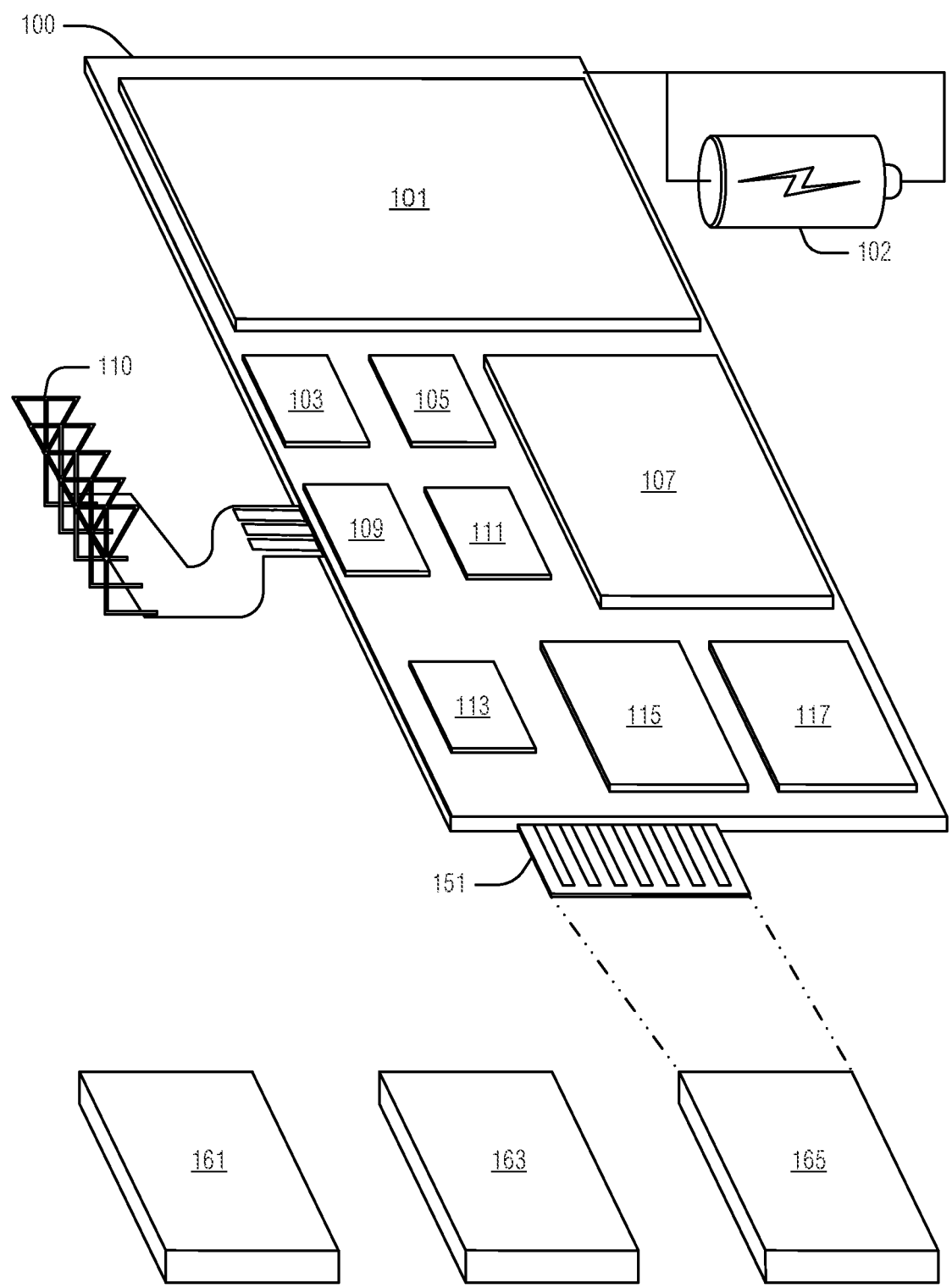
FIG. 1 is a block diagram of an example of an IoT device blank, according to an embodiment.

A first step to using IoT devices is to acquire and install those devices. However, the IoT device market is fragmented. Businesses, developers, or others generally construct a customized IoT device, or settle with a complete solution from a vendor. Often, such complete solutions are attractive when, for example, the developer does not have the time or expertise to construct their own devices. Further, such ready-made solutions are often cheaper. However, ready-made solutions tend to be limited and cater to the most broadly appealing IoT features. Accordingly, such devices are often sub-optimal for a given developer's needs.

In addition to the construction issues noted above, generally IoT devices are only useful when their network provides reliable communication, linking the IoT sensory capabilities with the developer to provide actionable information to the developer. Accordingly, these devices often rely on broad reaching wireless networks, such as those provided by cellular carriers. As the third generation partnership project (3GPP) release 14 and 15 standards are developed, greater attention is being paid to machine-to-machine (M2M) communications techniques directed to IoT devices. However, generally, a cellular carrier must approve (e.g., certify) the devices that will use the carrier's network. Certification is an additional hurdle to developing one's own customized IoT device.

What is needed is a hybrid solution to the development of IoT devices. An IoT device blank is a device that includes basic material allowing it to be customized, much like a key blank one may find at the hardware store. An IoT device blank includes processing and communications hardware, an external module attachment point (to customize sensor hardware) and communications path, as well as skeleton software to control the customization of the blank. These elements remain consistent for a given type of IoT device blank, although there may be different types (e.g., classes) of blanks, such as a micro blank to a macro blank (e.g., multiple sensor attachment points, greater processing power or storage, different radio access techniques, etc.). Because these elements are unchanging, a carrier may test and certify the IoT device blank, confirming the device's suitability to operate on the carrier's network.

A developer may acquire the IoT device blank, for example, acquire a sensor to attach to the blank, and install the blank at a location. The installer may then initiate (e.g., turn on) the IoT device blank. The skeleton software will determine that the device is in an initial (e.g., undifferentiated) state and contact a network endpoint (which is part of the certified skeleton software). The device blank will provide an indication of itself (e.g., a unique identifier) with this communication. The web-endpoint will locate a package for the IoT device blank based on the indication and send the package to the IoT device blank.

The transmitted package will at least include an application. The skeleton software of the IoT device blank will install this application. Part of this installation includes restricting the application's access to many underlying software and hardware components, thus permitting the carrier to feel comfortable with an uncertified application running on the carrier's network. The application will, however, have access to data generated by the sensor, and be able to process that data as well as direct the communication of the process data off of the IoT device.

Once the application is installed, the IoT device is no longer a blank, but is a custom IoT device. Again, this is partially analogous to a key blank one may purchase at a hardware store where a key grinder transfers the data from the model key to the key blank, producing a custom key from the blank. Similarly, here, an IoT device blank provides the necessary material to be customized, by the customer, into a custom IoT device. Moreover, as the IoT device blank is stable in hardware and software architecture and the custom elements (e.g., the application and attachable hardware) are isolated from that architecture, the carrier certification operates to ensure safe and effective operation of the custom IoT device on the carrier's network. Thus, developer costs are reduced, and a greater efficiency of IoT device deployment is achieved.

FIG. 1 is a block diagram of an example of an IoT device blank 100, according to an embodiment. The IoT device blank 100 includes a variety of hardware components to support the "key blank" nature of the device. For example, the IoT device blank 100 may include a processor 101 (e.g., a low-powered central processing unit, graphics processing unit, digital signal processor, etc.), memory (or non-volatile storage or both) 107, and one or more radios (e.g., radio 103 or radio 109 that are attachable to an antenna array 110). These components are computer hardware such as that described below with respect to FIG. 8 (e.g., circuitry).

The IoT device blank may include a wireless module (e.g., cellular modem 115 or wireless local area network (WLAN) or personal area network (PAN) component 117) to drive the radio 109 in conformance with a wireless networking standard. The IoT device blank 100 may also include one or more onboard sensors 111, such as a satellite positioning system, gyrometer, accelerometer, etc.

The IoT device blank 100 may also include a subscriber identity module (SIM) 113. Not only is the SIM 113 often required for access to a carrier's network, it also provides identity and security to the IoT device blank 100. The identity portion of the SIM 113 capabilities may, in an example, be used by the IoT device blank 100 to access a network (e.g., cloud, web) endpoint to acquire its customization package. In an example, the SIM module 113 may be included in the processor 101 or in another component of the module 100.

In an example, the processor 101 includes a controller and a transceiver. Operating together, these components permit the hardware to be further configured via software, for example, from or through a carrier. Again, the controller and transceiver are implemented in computer hardware, such as via circuitry.

The transceiver interacts with the wireless module 115 to handle communications for the IoT device blank 100. As the controller requests or produces data to be consumed elsewhere, the transceiver manages that transmission of this data.

In an example, the controller is arranged to detect what it plugged into it via a protocol being used and to receive different software packages based on this detection. For example, different devices may have parameters that are more critical than others. In an example, the detection determines whether the controller is plugged into a wearable application and vary the power level lower to control SAR emissions. In an example, the detection determiners whether the controller is plugged into an irrigation field sensor where long battery life is an important parameter. In an example, the detection determines whether the controller is plugged into a time mission critical application such as an oil field where the parameter priority for data is important.

In an example, The IMSI and IMEI may be tied to a list of capabilities of the device 100. The capabilities may be related to licenses or certifications. In an example, when the application and use case of the blank IoT module is determined the potential licenses and/or certifications may be trimmed to the minimum list required to operate the configured applications.

The controller is arranged to test the IoT device blank 100 to determine an initial state. This testing may include reading an initialization register or the like to ascertain that the blank 100 has not yet been configured. In response to determining that the IoT device blank 100 is in the initial state, the controller contacts a cloud endpoint to retrieve a configuration package. This contact message, transmission, etc., includes an identifier of the IoT device blank. Once the cloud endpoint responds with the package, the controller receives and installs the package, which includes an application. The controller then starts (e.g., runs, executes, etc.) the application, which will collect data (e.g., from a sensor 165) and transmit it, via the transceiver, to the cloud endpoint. Such initiation checking and automatic configuration of the IoT device blank 100 reduces the need for complex or expensive user interface elements on the IoT device blank 100 itself, reducing costs and simplifying operation for installers. In an example, the controller is arranged to take information from sensors 111 and transmit via transceiver 109 without the need for introspection of external sensors 165.

In an example, communication between the application and the other IoT device blanks components is handled through a message queue. When the application is installed, the controller registers the application with the message queue. The application may also requests publications by other elements (such as a sensor) via the message queue. By limiting internal communications in this way, greater control and security of the IoT device blank 100 is maintained, giving carrier's greater comfort in not certifying the application itself.

In an example, the package received from the carrier includes a library. In an example, the library includes a device driver to interface with a hardware component of the IoT device blank 100, such as the external module 165, or one or more of the onboard sensors 111. The library provides a convenient separation between pluggable hardware support and the application. For example, the developer may purchase the sensor from a third party vendor. The third party vendor will supply the device driver along with the hardware. The developer may then package the device driver in the library to be deployed with the application. In an example, when the controller installs the package, the controller installs the library. In an example, as part of the installation, the controller registers the library with the message queue. This registration permits the application to interact with the sensor via the message queue through the library. In an example, the sensor includes on or more of the following: a thermometer, a moisture sensor, a light sensor, an acoustic sensor, a movement sensor, an altimeter, a gyrometer, an accelerometer, a pressure sensor, a positioning sensor.

In an example, the package includes behavioral constraints. Here, the behavioral constraints may include a parameter value for a component of the operating environment of the IoT device. When the controller installs the package, the controller will set a corresponding parameter with the parameter value. This technique allows the already present components of the IoT device blank 100, such as the skeleton software, to be modified at the time of configuration. In an example, the component of the operating environment may include any one or more of the following: an application, a library, a management component, a notification component, a security circuitry, an transceiver, or a carrier component.

In an example, the package is a data structure. The data structure includes an application set including zero or more applications in addition to the application, a library set including zero or more libraries, a control set including zero or more component sets, the component sets including behavioral constraints on a corresponding component of the IoT operating environment. Thus, in a single structure, these components are separated and accessible to the controller. In an example, the package may be sent that includes only one element, such as a component set, after the initial state. In this way, additional configurations, over time, may be implemented through modification of existing components rather than re-installing or re-initializing the IoT device blank 100.

To augment the security of the device, the IoT device blank 100 may include security or cryptographic circuitry 105. The security circuitry 105 generally includes a secure storage area, processing capabilities, and cryptographic hardware. The security circuitry 105 may store keys, or operating parameters securely, and compare these parameters against current operating conditions to securely detect deviations, possibly indicating that the hardware or software of the IoT device blank is compromised. In addition, the security circuitry 105 may store and protect a cryptographic key-chain of trusted signers.

In an example, the security circuitry 105 is arranged to receive data and metadata from the transceiver. The data is generally data from a sensor that may be manipulated (e.g., filtered, refined, aggregated, etc.) and the metadata includes such things as routing, time of capture, type of hardware involved, etc. The security circuitry 105 is arranged to encrypt the data with a first technique and the metadata with a second technique. In an example, the difference between the techniques may be the key used whereas the remaining cryptographic elements remain the same. The two encrypted data (the data and the metadata) are combined into encrypted packaged data which is given to the transceiver to send. The use of these two encryption techniques allows the developer to ensure that their data is not compromised in transit by, for example, the carrier, while the metadata is protected from third parties but available to the carrier, for example, for routing, transmission metrics, etc.

In an example, security circuitry 105 is arranged to add audit data to the encrypted packaged data. Here, audit data is a cryptographically secure data structure to record audit events with respect to the encrypted package data. In an example, an audit event is any one or more of the following: viewing the data, viewing the metadata, modifying the data, modifying the metadata, receiving the encrypted packaged data, or transmitting the encrypted packaged data. In this way, an additional level of accountability is added, providing the developer with a greater ability to trust the carrier handling the IoT device blank 100 traffic.

The IoT blank device 100 also includes an attachment point (e.g., port, input-output, bus, interlink, etc.) 151. The attachment point 151 includes both a communication path and a physical configuration to attach an external physical module, such as module 165. The additional modules 161 and 163 are provided to illustrate that the attachment point 151 implements a standard connection that is attachable by any conforming module. The physical configuration may include friction locks, a snap mechanism, a magnetic lock, or other re-attachable or semi-permanent configuration to allow the attachment of the module 165 by field installer of the IoT blank device 100. In an example, the module 165 or the additional modules 161 and 163 may include any one or more of the following: a thermometer, a moisture sensor, a light sensor, an acoustic sensor, a movement sensor, an altimeter, a gyrometer, an accelerometer, a pressure sensor, a positioning sensor, an actuator, or a motor.

The communications path may be augmented by a separate power path to provide power to the module 165. In an example, power may be provided in the same physical path as data exchange on the communications path. A variety of connections may be implemented by the attachment point, such as one or more of nine-pin serial, universal serial bus, Ethernet, peripheral component interconnect express (PCIe), or serial AT attachment (SATA). In an example, the attachment 151 is virtual, implementing one or more connections via radio frequency, magnetic resonance, or sound, such as the IEEE 802.15.1, IEEE 802.15.4, ISO 13157 families of standards, or magnetic resonance NFC.

The IoT device blank 100 may include a notification component to provide carrier access to the IoT device blank 100. The notification component may be part of or work in conjunction with a carrier component. Whereas the notification component is tailored to a particular IoT device blank type, the carrier component is tailored to a given carrier. In an example, the carrier component is arranged to receive a configuration from the carrier. Here, the configuration may specify device components for upper-level carrier operation. The carrier component may be arranged to configure the IoT device blank's operating environment to conform to the configuration. These configuration parameters may include security protocols, billing limits, frequencies to use, time periods of operation, etc. In an example, the carrier component is arranged to receive an update of the package from the carrier and install (e.g., via the controller) the update on the IoT device blank 100.

The notification component addresses monitoring and, in an example, configuration of the IoT device blank 100 on behalf of the carrier or the developer. The notification component is not accessible to the application. For example, the notification component does not have a publish stream to which the application may subscribe. This level of separation ensures greater security of the device blank 100 with uncertified applications.

The notification component is arranged to provide notifications to the carrier or the developer about a state of the IoT device blank 100. In an example, the state is one or more of the following: a hardware state, a kernel state, an operating system state, an application state, a management component state, a security circuitry state, a library state, a transceiver state, or a carrier component state.

In an example, the notification component (e.g., to provide the state), is arranged to receive a diagnostic request from the carrier. The notification component may then perform the diagnostic contained in the diagnostic request. In an example, the diagnostic request includes executable software that is run to perform the diagnostic. In an example, the diagnostic request includes identification of an already known diagnostic routine that is run to perform the diagnostics request. The notification component, in response to performing the diagnostic, provide the results to the carrier. In this way, the developer, via the carrier, or the carrier themselves, may perform maintenance, monitoring, etc. of the device hardware independently of the application. In an example, the notification component (e.g. to provide carrier network choice and quality of service) directs the IoT device blank 100 to communicate via the transceivers 115 in a variety of modes as indicated by 3GPP network standards (e.g. CAT 1, CAT M, NB-IoT or others such as EC-GSM).

The hardware of the IoT device blank 100 is static and unchanging. Customization occurs via the connectable modules 161, 163, or 165. These modules may implement one or more sensor or actuators to augment the capabilities of the IoT device blank 100. In an example, the IoT device blank 100 includes an auditing mechanism, e.g., via the security circuitry 105, that ensures the integrity of the IoT device blank after certification by a carrier.

Figure 2:
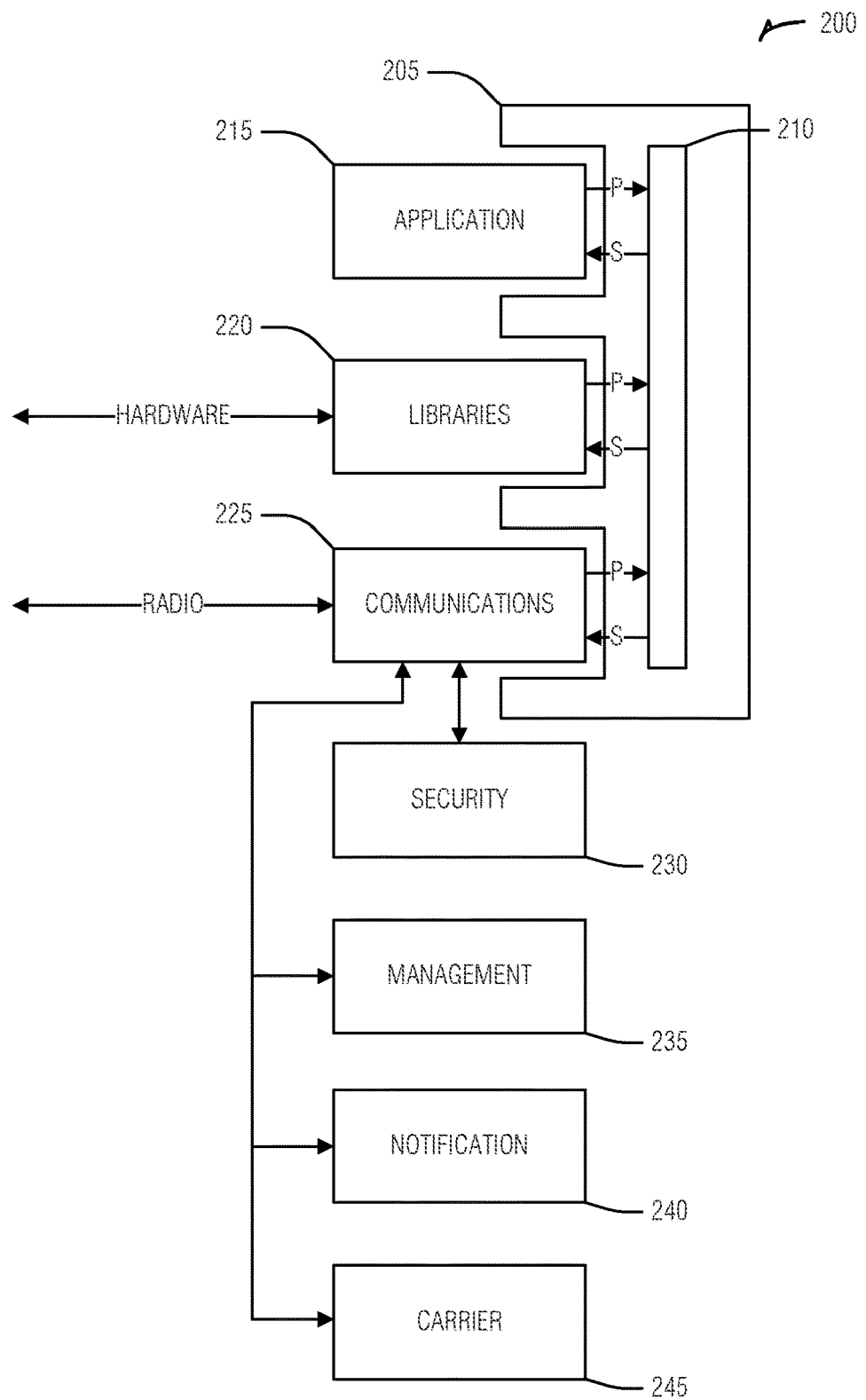
FIG. 2 illustrates a component communications architecture to implement an IoT device blank, according to an embodiment.

FIG. 2 illustrates a component communications architecture 200 to implement an IoT device blank, according to an embodiment. The components and features of the architecture 200 are implemented in computer hardware, such as that described above and below (e.g., circuitry discussed with respect to FIG. 8).

The architecture 200 includes a message passing framework 205. The message framework 205 includes a message pipe 210 to which registered components may publish and subscribe. A component registers a publication to which it provides data in the form of a message. Interested components also subscribe to the publications of other components. When a message is published, the message framework 205 accepts the message and distributes it to the subscribed components. In this way, communications are strictly controlled, preventing some components, such as the application 215, from interfering with the operation of the device blank. In an example, an access control list governs which components may subscribe to which other components, providing additional configurable levels or security.

The message framework 205, the communications component 225 (e.g., transceiver), the security component 230, the management component (e.g., controller) 235, the notification component 240, and the carrier component 245 are all part of the operating environment of the IoT device blank that is certified by a carrier. The application 215 and the libraries 220 are the customization components that are received in the network packaged from an endpoint upon device initialization.

The application 215, is installed by the controller 235 after being received by the transceiver 225. The package is received in response to a controller 235 "phone-home" request following a test to determine that the IoT device is in an initial (e.g., blank) state upon, for example, power on self-test (POST).

The package may also include the libraries 220, though this is optional. The libraries may augment the application 215 (e.g., provide a math library to the application 215) or provide an interface to hardware. In an example, the libraries 220 include hardware drivers to, for example, operate user attached modules (e.g., custom modules). In this way, the library enables the custom hardware additions implemented by the customer.

The package may also include behavioral constraints. These constraints provide configuration information to the static infrastructure 200 components (e.g., other than the application 215 and libraries 220). Thus, the transceiver 225 may be configured by the carrier, for example, via the behavioral constraints.

The communications component 225 interfaces with the radio to communicate to the carrier. The communication component 225 may implement a M2M standard, such as MQTT or XMPP. The security component 230 may implement cryptographic measures, including auditing of the data or messages. The management component 235 provides a management interface between the IoT device and external entities, such as the carrier, however, the notification component 240 may provide lower level diagnostic reporting and event reporting. The carrier component 245 may implement carrier specific higher-level functions, such as rate metering, billing, etc.

Figure 3:
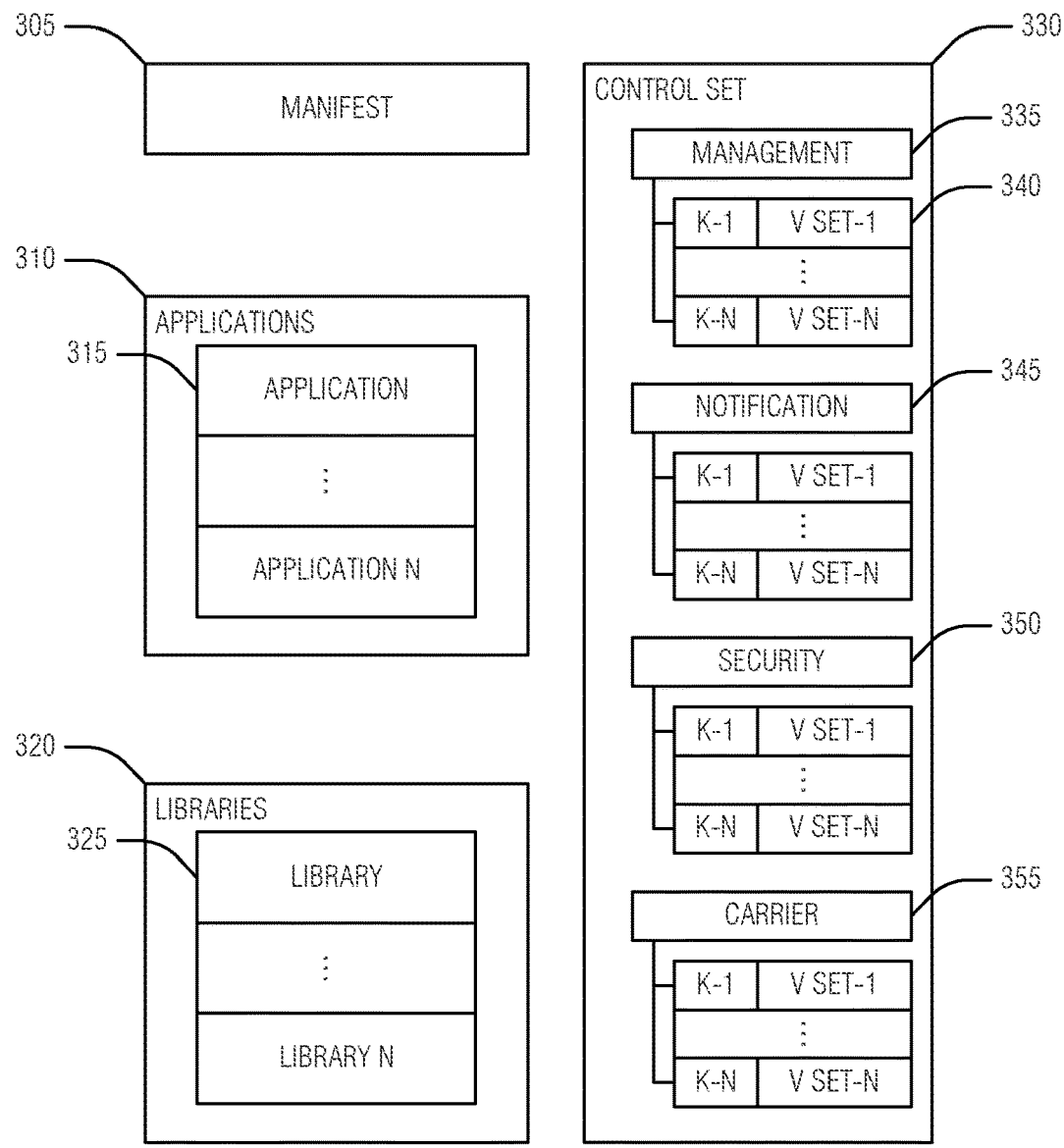
FIG. 3 illustrates an example of a data structure that supports an IoT device blank package, according to an embodiment.

FIG. 3 illustrates an example of a data structure 300 that supports an IoT device blank package, according to an embodiment. The data structure 300 may include a manifest to define what is in the package (e.g., in an archive). The applications structure 310 may be a sub-directory, or enclosed package, to hold one or more applications 315. Similarly, the library structure 320 may contain one or more libraries 325. The behavioral constraints may be stored in a control set 330. The control set may include a sub-set for one or more of the architecture components, such as the management set 335, the notification set 345, the security set 350, and the carrier set 355. Each set may have one or more key value pairs 340.

Figure 4:
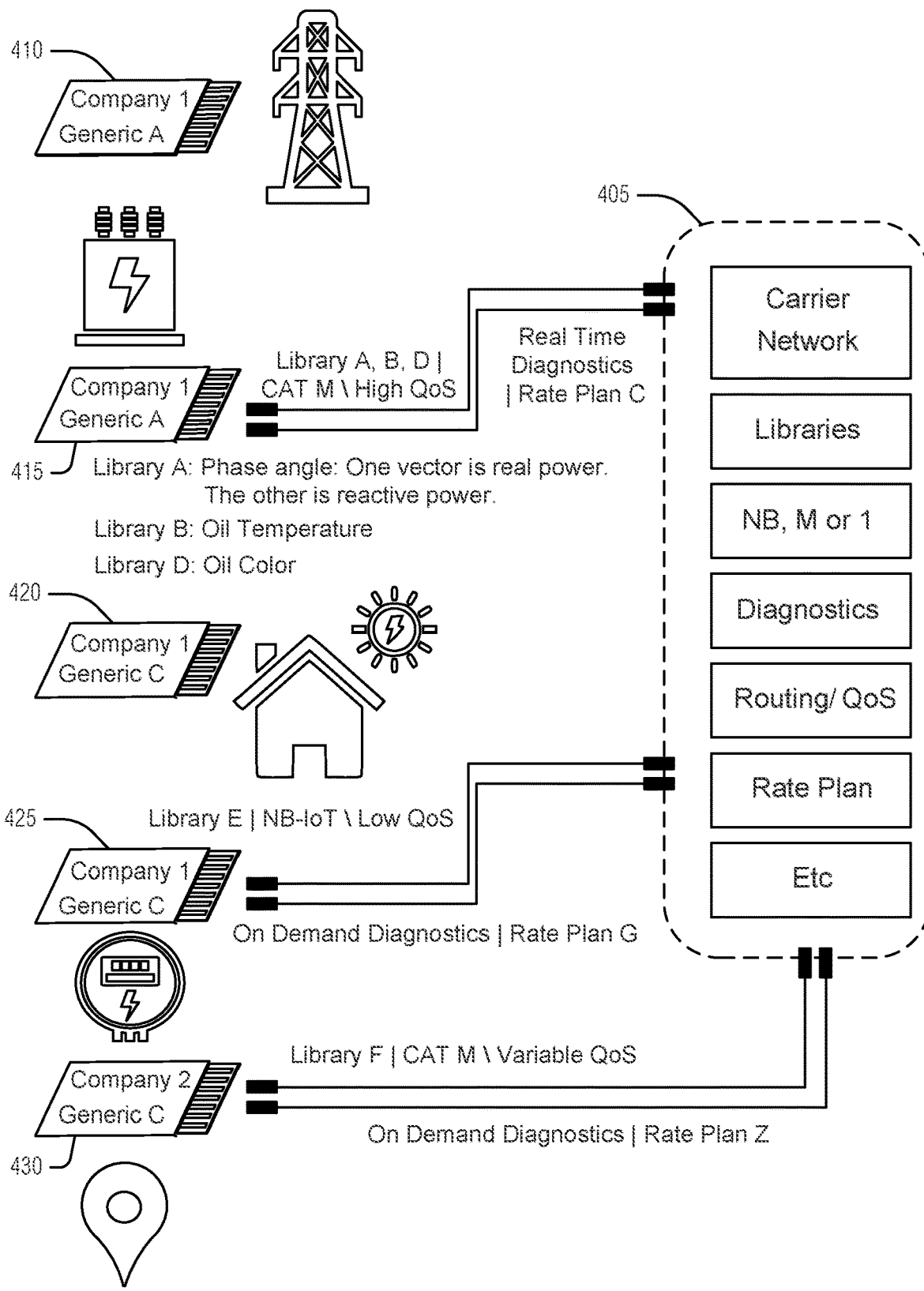
FIG. 4 illustrates a block diagram of an example of a system using an IoT device blank, according to an embodiment.

FIG. 4 illustrates a block diagram of an example of a system 400 using an IoT device blank, according to an embodiment. FIG. 4 illustrates a network including Internet of Things (IoT) device blanks (e.g., 410, 415, 420, 425, and 430), such as that described above with respect to FIG. 1. As indicated above, the IoT device blanks communicated to a central authority (e.g., a carrier or developer system) to effectuate the relatively simply mechanism to transform the device blanks into differentiated IoT devices.

In an example, the IoT device blanks connect to a network carrier system 405 using a licensed network band, such as an ultra-narrowband, a low band, a high band, a 3GPP LTE band, or the like. Intermediate connections between the IoT device blanks and the network carrier system 405 may include unlicensed bands, such as those used in the IEEE 802.11 or 802.15.1 families of standards, Near Field Communication (NFC), or the like.

An IoT device blank (e.g., 410-430) may attempt to connect to the network carrier system 405 by "phoning home" to a predetermined network location (e.g., endpoint), such as by using a pre-programmed phone number. The network carrier system 405 may receive a unique identifier from the IoT device blank. The unique identifier may include a number, database identifier or location, or the like that may be used by the network carrier system 405 to recognize the device. The network carrier system 405 may use the unique identifier to locate or determine an application to send to the IoT device blank. In an example, the unique identifier may be assigned to the IoT device blank at a certification operation before the IoT device blank is activated and turned on. For example, the network carrier system 405 may represent a telephone or internet carrier that certifies IoT device blanks. The IoT device blank may be certified by the carrier and the unique identifier may be assigned by the carrier and applied to the IoT device blank after certification. Additionally, the IoT device blank may send or receive information about its location, customer, company, type of sensors, rules needed, etc.

After connecting with the network carrier system 405, the IoT device blank may receive, from the network carrier system 405, an application to run on the IoT device blank. The application may correspond to a sensor or a set of sensors connected to the IoT device blank. As shown in FIG. 4, the IoT device blanks 410-430 may correspond with different types of undifferentiated or blank configurations. It should be noted that "bank" does not mean empty, but rather it has not yet been tailored to a specific task. For example, a "Generic C" chipset and configuration may include Global Positioning Sensor (GPS) components while a "Generic A" chipset and configuration may omit the GPS components. Different IoT device blank configurations may be applied for different companies, customers, or carriers, or IoT device blank configurations may be made universal. In another example, the generic configuration types may correspond to processing power, network priority, location, or the like.

As seen in FIG. 4, IoT device blank 425 and IoT device blank 430 may represent identical chipsets and configurations before an application is loaded or sensors are attached. The IoT device blanks 425 and 430 may be used by or assigned to different companies, such as Company 1 for device 425 and Company 2 for device 430. Company 1 may use device 425 for a first purpose including using a first set of sensors (e.g., to measure a power meter) and Company 2 may use device 430 for a second purpose including using a second set of sensors, or the first set of sensors with a different application, (e.g., to track a location of the device 430). The devices 425 and 430 may be identical when certified by a carrier, and then sent out to Company 1 and Company 2. The devices 425 and 430 may remain identical, other than sensors attached to the devices, until the devices 425 and 430 are turned on, phone home, and receive applications appropriate to the purposes of the devices 425 and 430.

When an IoT device blank (e.g., 410-430) receives an application from the network carrier system 405, the IoT device blank may run the application and become a specialized IoT device. At any time, the specialized IoT device may receive a new application to run from the network carrier system 405 and become a newly specialized IoT device, or may be remotely wiped back to a certified state and returned to being an IoT device blank. The change in application or wiping may be initiated by the carrier of the network carrier system 405, by a company (e.g., Company 1 or Company 2), by an end-customer (e.g., a homeowner using an IoT device blank with temperature sensors as thermostat), etc. The change may include an upgrade or update to the application, libraries, drivers, or the like.

The IoT device blanks 410-430 may communicate with the network carrier system 405 using predetermined or dynamic bitrates or Quality of Service (QoS) levels. The communication may include a rate plan for the IoT device blank. In an example, the network carrier system 405 may initiate remote service of the IoT device blank. For example, if a transmission from or to the IoT device blank fails, a diagnostic process may be initiated by the network carrier system 405, such as using a notification communication protocol.

Figure 5:
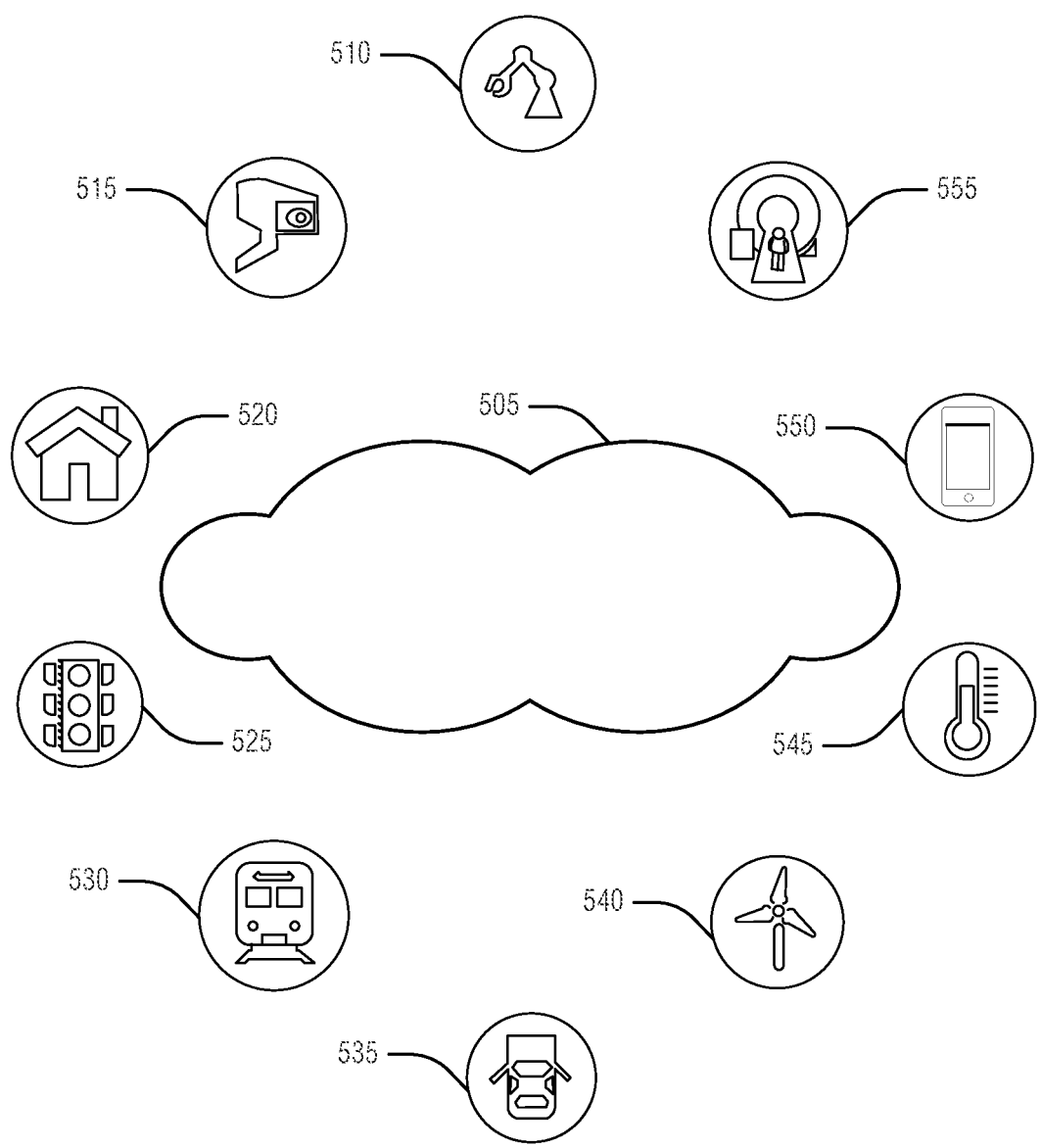
FIG. 5 illustrates a variety of sensor examples, according to an embodiment.

FIG. 5 illustrates a variety of sensor examples, according to an embodiment. The sensors 510-555 may send data to a network or cloud 505 using the IoT device blank. As described above for FIG. 4, the IoT device blanks may receive an application to run a sensor (e.g., 510-555) from the network 505. In an example, an IoT device blank may run an application to control a sensor, such as a robotic sensor 510 (e.g., to monitor functionality), a video sensor 515, a residential sensor 520, a traffic sensor 525, a transportation sensor 530, a consumer vehicle sensor 535, an energy sensor 540, a weather or climate sensor 545, a mobile device sensor 550, a healthcare sensor 555, or the like. In an example, a sensor may include an air quality sensor, a carbon monoxide or carbon dioxide monitor, a temperature sensor, an accelerometer, a tachometer, an infrared sensor, an ultrasonic sensor, or the like.

Figure 6:
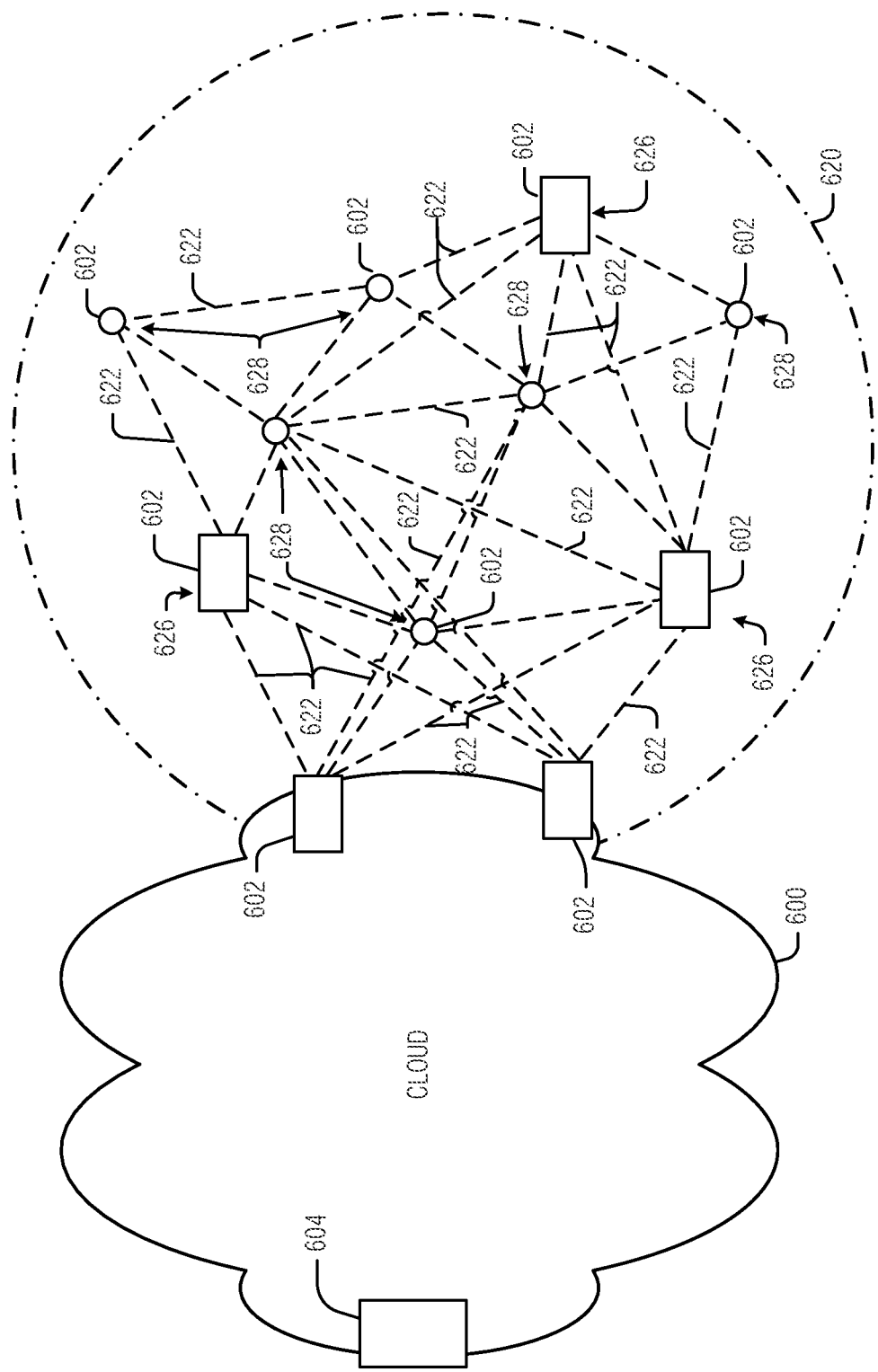
FIG. 6 illustrates a cloud and an IoT mesh network topology, according to an embodiment.

FIG. 6 is a drawing of a cloud computing network, or cloud 600, in communication with a mesh network of IoT devices 602, that may be termed a fog 620, operating at the edge of the cloud 600. To simplify the diagram, not every IoT device 602 is labeled. IoT communications between each other and cloud 600 services may be carried out in the manner illustrated by FIG. 6B.

The fog 620 may be considered to be a massively interconnected network wherein a number of IoT devices 602 are in communications with each other, for example, by radio links 622. This may be performed using the open interconnect consortium (OIC) standard specification 6.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T-.M.A.N.), among others.

Three types of IoT devices 602 are shown in this example, gateways 624, data aggregators 626, and sensors 628, although any combinations of IoT devices 602 and functionality may be used. The gateways 624 may be edge devices that provide communications between the cloud 600 and the fog 620, and may also provide the backend process function for data obtained from sensors 628, such as motion data, flow data, temperature data, and the like. The data aggregators 626 may collect data from any number of the sensors 628, and perform the back end processing function for the analysis. The results, raw data, or both may be passed along to the cloud 600 through the gateways 624. The sensors 628 may be full IoT devices 602, for example, capable of both collecting data and processing the data. In some cases, the sensors 628 may be more limited in functionality, for example, collecting the data and allowing the data aggregators 626 or gateways 624 to process the data.

Communications from any IoT device 602 may be passed along the most convenient path between any of the IoT devices 602 to reach the gateways 624. In these networks, the number of interconnections provide substantial redundancy, allowing communications to be maintained, even with the loss of a number of IoT devices 602. Further, the use of a mesh network may allow IoT devices 602 that are very low power or located at a distance from infrastructure to be used, as the range to connect to another IoT device 602 may be much less than the range to connect to the gateways 624.

The fog 620 of these IoT devices 602 devices may be presented to devices in the cloud 600, such as a server 604, as a single device located at the edge of the cloud 600, e.g., a fog 620 device. In this example, the alerts coming from the fog 620 device may be sent without being identified as coming from a specific IoT device 602 within the fog 620. For example, an alert may indicate that a pumpjack in a field is having operational difficulties and present the relevant data, even though the specific IoT devices 602 that determined the problems are not specifically identified.

In some examples, the IoT devices 602 may be configured using an imperative programming style, e.g., with each IoT device 602 having a specific function and communication partners. However, the IoT devices 602 forming the fog 620 device may be configured in a declarative programming style, allowing the IoT devices 602 to reconfigure their operations and communications, such as to determine needed resources in response to conditions, queries, and device failures. As an example, a query from a user located at a server 604 about the operations of a subset of pumpjacks monitored by the IoT devices 602 may result in the fog 620 device selecting the IoT devices 602, such as particular sensors 628, needed to answer the query. The data from these sensors 628 may then be aggregated and analyzed by any combination of the sensors 628, data aggregators 626, or gateways 624, before being sent on by the fog 620 device to the server 604 to answer the query. In this example, IoT devices 602 in the fog 620 may select the sensors 628 used based on the query, such as adding data from flow sensors or temperature sensors. Further, if some of the IoT devices 602 are not operational, other IoT devices 602 in the fog 620 device may provide analogous data, if available.

Figure 7:
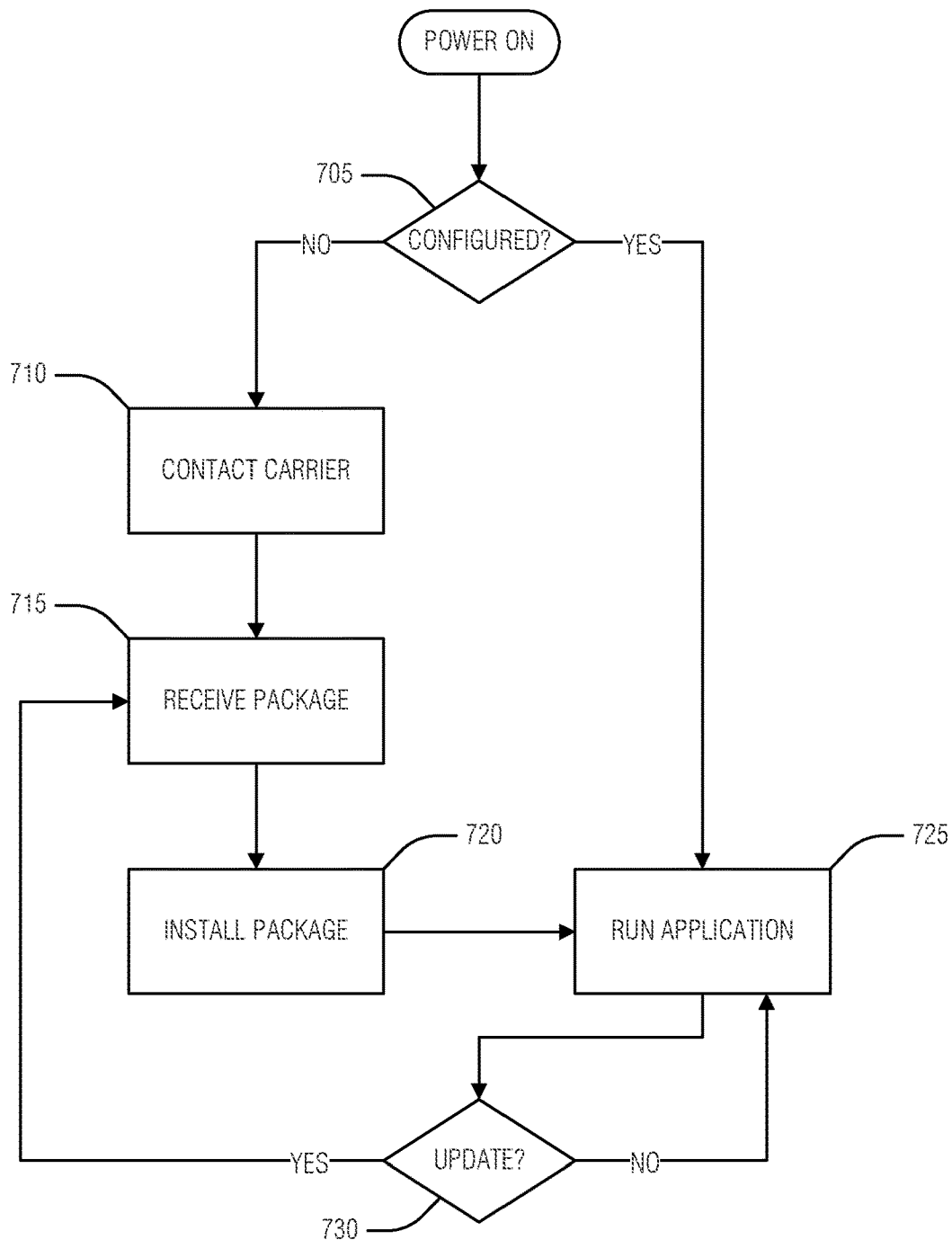
FIG. 7 illustrates a flow diagram of an example of a method for an IoT device blank implementation, according to an embodiment.

FIG. 7 illustrates a flow diagram of an example of a method 700 for an IoT device blank implementation, according to an embodiment. The operations of the method 700 are implemented in computer hardware, such as that described above, and below (e.g., circuitry described with respect to FIG. 8).

At decision 705, the IoT device is tested to determine an initial state. That is, whether or not the IoT device is in an initial state (e.g., undifferentiated) or not (already customized).

At operation 710, a cloud endpoint is contacted in response to the IoT device being in the initial state. The contact includes a unique identifier of the IoT device.

At operation 715, in response to its contact, the IoT device receives a package. The package includes at least one application. In example, where more than one application is received, the applications may have different security access (e.g., based on behavioral constraints) that restrict to which libraries (e.g., if included) each application may communicate.

At operation 720, the IoT device (e.g., management component) installs the package. This includes registering the application with a message queue through which application communications will occur. The application has no other mechanism by which to communicate to other components of the IoT device other than through the message queue.

At operation 725, the application is run. The running application will communicate via the message queue to interface with sensors, or IoT device intrinsic hardware to produce data (e.g., results). These will then be communicated to a cloud endpoint via a communications component.

At decision 730, the IoT device may check, or periodically be pushed, an update. The update may be of the entire package or of a subset (e.g., one control set for a component or one key-value pair). If there is no update, the application continues to run. Otherwise, the package is received and installed.

Figure 8:
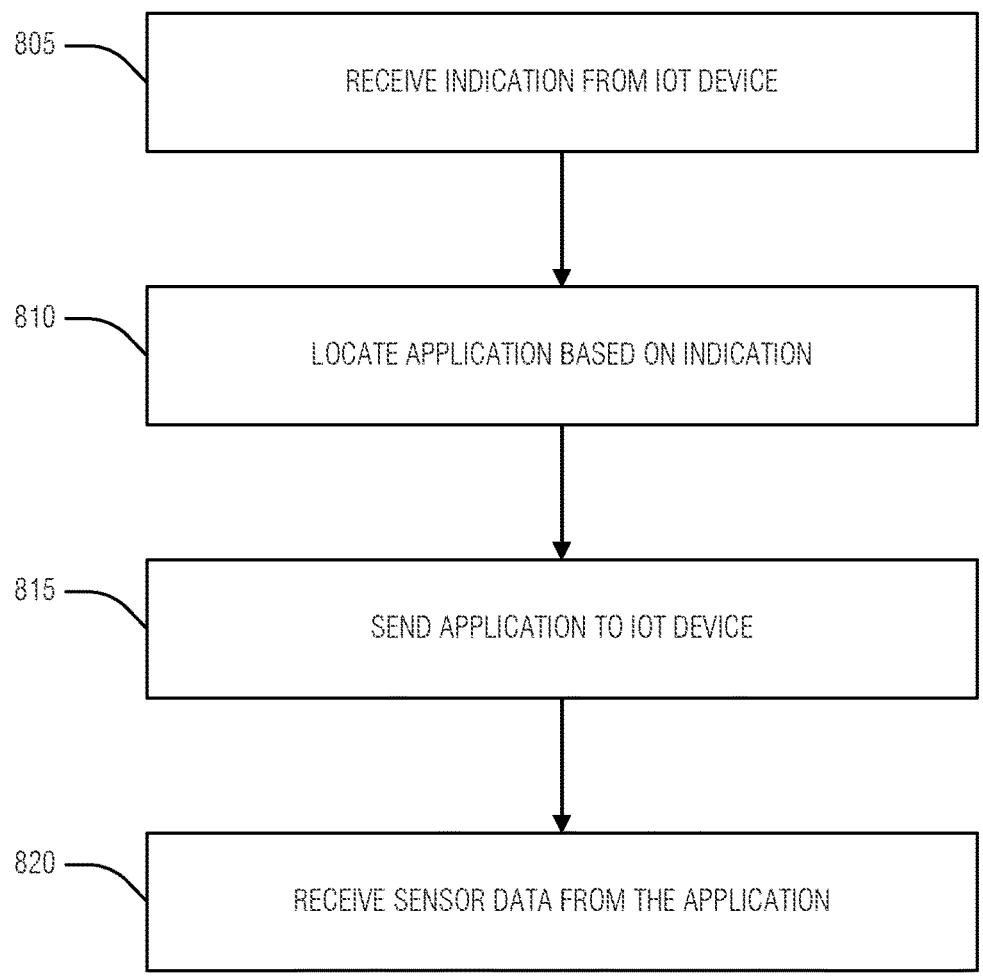
FIG. 8 illustrates a flow diagram of an example of a method for a network architecture for an IoT device, according to an embodiment.

FIG. 8 illustrates a flow diagram of an example of a method 800 for a network architecture for an IoT device, according to an embodiment. The operations of the method 800 are implemented in computer hardware, such as that described above and below (e.g., circuitry discussed in reference to FIG. 8). The method 800 includes an operation 805 to receive an indication from an IoT device, such as a pre-certified IoT blank device. The indication may be received using a transceiver or a receiver. In an example, receiving the indication includes receiving the indication over a licensed carrier band, such as an IoT ultra-narrow-band, a low band, a high band, etc.

The method 800 includes an operation 810 to locate an application based on the indication. The indication may include a unique identifier or a request for configuration information. The application may be located using a search engine, such as by querying a database or a third-party network. The method 800 may include locating a second application using the unique identifier and sending the second application to the IoT device to replace the application, such as at a later time.

The method 800 includes an operation 815 to send the application to the pre-certified IoT blank device. Operation 815 may include sending a set of behavioral rules to the device, such as a QoS rate, a sleep schedule, and a communications mechanism. In an example, the behavioral rules include a network choice, security policy, diagnostic requirement, or rate plan. In another example, sending the application to the IoT device includes sending a library to run on the IoT device. The library may include a driver to control a sensor, such as a sensor corresponding to, or run by, the application.

The method 800 includes an operation 820 to receive sensor data from the application, such as by receiving data from the IoT device corresponding to a sensor on the IoT device operated using the application. The method 800 may include forwarding the received data to a third-party network. In an example, the method 800 includes certifying the IoT device prior to receiving the indication. In another example, the method 800 includes not certifying the sensor or the application using the network carrier system.

Figure 9:
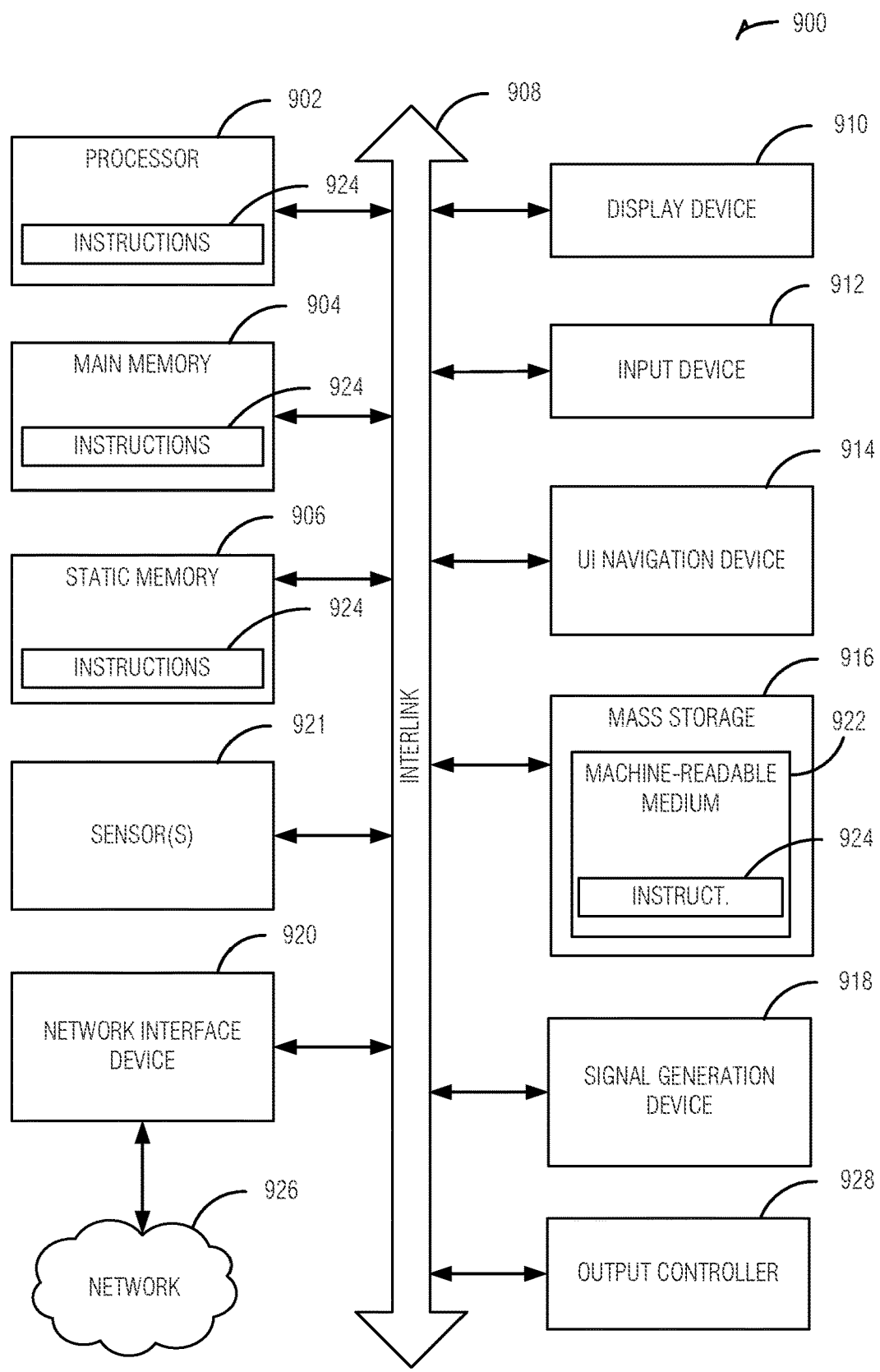
FIG. 9 is a block diagram illustrating an example of a machine upon which one or more embodiments may be implemented.

FIG. 9 illustrates a block diagram of an example machine 900 upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

ADDITIONAL NOTES & EXAMPLES

Example 1 is an internet-of-things (IoT) device, the device comprising: a transceiver to: receive data from an application running on the IoT device via a message queue; and transmit the data to the cloud endpoint via a transceiver of the IoT device; and a controller to: test the IoT device to determine whether the IoT device is in an initial state; contact, in response to a determination that the IoT device is in the initial state, the cloud endpoint, via the transceiver, to retrieve a package, the contact including a message with an identifier of the IoT device; receive the package, the package including an application; install the package including registering the application with a message queue of the IoT device; and run the application.

In Example 2, the subject matter of Example 1 optionally includes wherein to transmit the data includes the transceiver to: receive the data via the message queue; package the data in accordance with an IoT transmission standard; and communicate the packaged data.

In Example 3, the subject matter of any one or more of Examples 1-2 optionally include wherein the IoT device includes security circuitry, wherein the transceiver interfaces with the security circuitry to secure the packaged data, the security circuitry to: receive the data and metadata from the transceiver; encrypt the data with a first technique; encrypt the metadata with a second technique; and provide encrypted packaged data to the transceiver.

In Example 4, the subject matter of Example 3 optionally includes wherein the security circuitry adds audit data to the encrypted packaged data, the audit data providing a cryptographically secure data structure to record audit events with respect to the encrypted packaged data.

In Example 5, the subject matter of Example 4 optionally includes wherein the audit events are at least one of viewing the data, viewing the metadata, modifying the data, modifying the metadata, receiving the encrypted packaged data, or transmitting the encrypted packaged data.

In Example 6, the subject matter of any one or more of Examples 1-5 optionally include wherein the package includes a library, wherein to install the package includes the controller to: add the library to an operating environment of the IoT device; and register the library with the message queue to communicate with the application.

In Example 7, the subject matter of Example 6 optionally includes wherein the library includes a device driver, the device driver to interface with a hardware component of the IoT device.

In Example 8, the subject matter of Example 7 optionally includes wherein the hardware component is at least one of a thermometer, a moisture sensor, a light sensor, an acoustic sensor, a movement sensor, an altimeter, a gyrometer, an accelerometer, a pressure sensor, a positioning sensor, an actuator, or a motor.

In Example 9, the subject matter of any one or more of Examples 1-8 optionally include wherein the IoT device includes a notification component, wherein the notification component is not accessible to the application, wherein the notification component is to provide notifications to the carrier about a state of the IoT device.

In Example 10, the subject matter of Example 9 optionally includes wherein the state of the IoT device is at least one of a hardware state, a kernel state, an operating system state, an application state, a management component state, a security circuitry state, a library state, a transceiver state, or a carrier component state.

In Example 11, the subject matter of any one or more of Examples 9-10 optionally include wherein the notification component is to: receive a diagnostic request from the carrier via the transceiver of the IoT device; perform a diagnostic contained in the diagnostic request; and provide a result of the diagnostic to the carrier via the transceiver.

In Example 12, the subject matter of any one or more of Examples 1-11 optionally include a carrier component to: receive a configuration from a carrier, the configuration specifying device components for upper-level carrier operation; and configure an operating environment of the IoT device to conform to the configuration.

In Example 13, the subject matter of any one or more of Examples 1-12 optionally include wherein the package includes behavioral constraints, the behavioral constraints including a parameter value for a component of the operating environment of the IoT device, wherein to install the package includes the controller to set a corresponding parameter with the parameter value.

In Example 14, the subject matter of Example 13 optionally includes wherein the component of the operating environment is at least one of an application, a library, a management component, a notification component, a security circuitry, an transceiver, or a carrier component.

In Example 15, the subject matter of any one or more of Examples 1-14 optionally include wherein the package is a data-structure including: an application set including zero or more applications in addition to the application; a library set including zero or more libraries; and a control set including zero or more component sets, the component sets including behavioral constraints on a corresponding component of the IoT operating environment.

In Example 16, the subject matter of any one or more of Examples 1-15 optionally include a carrier component to: receive an update of the package from the carrier; and install the update.

Example 17 is a method for customizing an internet-of-things (IoT) device blank, the method performed by hardware of an IoT device blank, the method comprising: test the IoT blank device to determine an initial state; contacting, in response to a determination that the IoT blank device is in the initial state, the cloud endpoint, via a transceiver, to retrieve a package, the contact including a message with an identifier of the IoT blank device; receiving the package, the package including an application; installing the package including registering the application with a message queue of the IoT blank device; running the application; receiving data from an application running on the IoT blank device via a message queue; and transmitting the data to the cloud endpoint via the transceiver of the IoT blank device.

In Example 18, the subject matter of Example 17 optionally includes wherein transmitting the data includes: receiving the data via the message queue; packaging the data in accordance with an IoT transmission standard; and communicating the packaged data.

In Example 19, the subject matter of any one or more of Examples 17-18 optionally include wherein the IoT blank device includes security circuitry, wherein the transceiver interfaces with the security circuitry to secure the packaged data by: receiving the data and metadata from the transceiver; encrypting the data with a first technique; encrypting the metadata with a second technique; and providing encrypted packaged data to the transceiver.

In Example 20, the subject matter of Example 19 optionally includes adding audit data to the encrypted packaged data, the audit data providing a cryptographically secure data structure to record audit events with respect to the encrypted packaged data.

In Example 21, the subject matter of Example 20 optionally includes wherein the audit events are at least one of viewing the data, viewing the metadata, modifying the data, modifying the metadata, receiving the encrypted packaged data, or transmitting the encrypted packaged data.

In Example 22, the subject matter of any one or more of Examples 17-21 optionally include wherein the package includes a library, and wherein installing the package includes: adding the library to an operating environment of the IoT blank device; and registering the library with the message queue to communicate with the application.

In Example 23, the subject matter of Example 22 optionally includes wherein the library includes a device driver, the device driver to interface with a hardware component of the IoT blank device.

In Example 24, the subject matter of Example 23 optionally includes wherein the hardware component is at least one of a thermometer, a moisture sensor, a light sensor, an acoustic sensor, a movement sensor, an altimeter, a gyrometer, an accelerometer, a pressure sensor, a positioning sensor, an actuator, or a motor.

In Example 25, the subject matter of any one or more of Examples 17-24 optionally include providing notifications to the carrier about a state of the IoT blank device by a notification component of the IoT blank device, wherein the notification component is not accessible to the application.

In Example 26, the subject matter of Example 25 optionally includes wherein the state of the IoT blank device is at least one of a hardware state, a kernel state, an operating system state, an application state, a management component state, a security circuitry state, a library state, a transceiver state, or a carrier component state.

In Example 27, the subject matter of any one or more of Examples 25-26 optionally include receiving a diagnostic request from the carrier via the transceiver of the IoT blank device; performing a diagnostic contained in the diagnostic request; and providing a result of the diagnostic to the carrier via the transceiver.

In Example 28, the subject matter of any one or more of Examples 17-27 optionally include receiving a configuration from a carrier, the configuration specifying device components for upper-level carrier operation; and configuring an operating environment of the IoT blank device to conform to the configuration.

In Example 29, the subject matter of any one or more of Examples 17-28 optionally include wherein the package includes behavioral constraints, the behavioral constraints including a parameter value for a component of the operating environment of the IoT blank device, wherein installing the package includes setting a corresponding parameter with the parameter value.

In Example 30, the subject matter of Example 29 optionally includes wherein the component of the operating environment is at least one of an application, a library, a management component, a notification component, a security circuitry, an transceiver, or a carrier component.

In Example 31, the subject matter of any one or more of Examples 17-30 optionally include wherein the package is a data-structure including: an application set including zero or more applications in addition to the application; a library set including zero or more libraries; and a control set including zero or more component sets, the component sets including behavioral constraints on a corresponding component of the IoT operating environment.

In Example 32, the subject matter of any one or more of Examples 17-31 optionally include receiving an update or the package from the carrier; and installing the update.

Example 33 is at least one machine-readable medium including instructions for operation of a computing system that, when executed by a machine, cause the machine to perform any of the methods of Examples 17-32.

Example 34 is an apparatus comprising means for performing any of the methods of Examples 17-32.

Example 35 is a system for customizing an internet-of-things (IoT) device blank, the system performed by hardware of an IoT device blank, the system comprising: means for test the IoT blank device to determine an initial state; means for contacting, in response to a determination that the IoT blank device is in the initial state, the cloud endpoint, via a transceiver, to retrieve a package, the contact including a message with an identifier of the IoT blank device; means for receiving the package, the package including an application; means for installing the package including registering the application with a message queue of the IoT blank device; means for running the application; means for receiving data from an application running on the IoT blank device via a message queue; and means for transmitting the data to the cloud endpoint via the transceiver of the IoT blank device.

In Example 36, the subject matter of Example 35 optionally includes wherein the means for transmitting the data include: means for receiving the data via the message queue; means for packaging the data in accordance with an IoT transmission standard; and means for communicating the packaged data.

In Example 37, the subject matter of any one or more of Examples 35-36 optionally include wherein the IoT blank device includes security circuitry, wherein the transceiver interfaces with the security circuitry to secure the packaged data with: means for receiving the data and metadata from the transceiver; means for encrypting the data with a first technique; means for encrypting the metadata with a second technique; and means for providing encrypted packaged data to the transceiver.

In Example 38, the subject matter of Example 37 optionally includes means for adding audit data to the encrypted packaged data, the audit data providing a cryptographically secure data structure to record audit events with respect to the encrypted packaged data.

In Example 39, the subject matter of Example 38 optionally includes wherein the audit events are at least one of viewing the data, viewing the metadata, modifying the data, modifying the metadata, receiving the encrypted packaged data, or transmitting the encrypted packaged data.

In Example 40, the subject matter of any one or more of Examples 35-39 optionally include wherein the package includes a library, and wherein the means for installing the package include: means for adding the library to an operating environment of the IoT blank device; and means for registering the library with the message queue to communicate with the application.

In Example 41, the subject matter of Example 40 optionally includes wherein the library includes a device driver, the device driver to interface with a hardware component of the IoT blank device.

In Example 42, the subject matter of Example 41 optionally includes wherein the hardware component is at least one of a thermometer, a moisture sensor, a light sensor, an acoustic sensor, a movement sensor, an altimeter, a gyrometer, an accelerometer, a pressure sensor, a positioning sensor, an actuator, or a motor.

In Example 43, the subject matter of any one or more of Examples 35-42 optionally include means for providing notifications to the carrier about a state of the IoT blank device by a notification component of the IoT blank device, wherein the notification component is not accessible to the application.

In Example 44, the subject matter of Example 43 optionally includes wherein the state of the IoT blank device is at least one of a hardware state, a kernel state, an operating system state, an application state, a management component state, a security circuitry state, a library state, a transceiver state, or a carrier component state.

In Example 45, the subject matter of any one or more of Examples 43-44 optionally include means for receiving a diagnostic request from the carrier via the transceiver of the IoT blank device; means for performing a diagnostic contained in the diagnostic request; and means for providing a result of the diagnostic to the carrier via the transceiver.

In Example 46, the subject matter of any one or more of Examples 35-45 optionally include means for receiving a configuration from a carrier, the configuration specifying device components for upper-level carrier operation; and means for configuring an operating environment of the IoT blank device to conform to the configuration.

In Example 47, the subject matter of any one or more of Examples 35-46 optionally include wherein the package includes behavioral constraints, the behavioral constraints including a parameter value for a component of the operating environment of the IoT blank device, wherein the means for installing the package include means for setting a corresponding parameter with the parameter value.

In Example 48, the subject matter of Example 47 optionally includes wherein the component of the operating environment is at least one of an application, a library, a management component, a notification component, a security circuitry, an transceiver, or a carrier component.

In Example 49, the subject matter of any one or more of Examples 35-48 optionally include wherein the package is a data-structure including: an application set including zero or more applications in addition to the application; a library set including zero or more libraries; and a control set including zero or more component sets, the component sets including behavioral constraints on a corresponding component of the IoT operating environment.

In Example 50, the subject matter of any one or more of Examples 35-49 optionally include means for receiving an update or the package from the carrier; and means for installing the update.

Example 51 is a network carrier system comprising: a receiver to: receive an indication from a pre-certified Internet of Things (IoT) blank device, the indication including a unique identifier and a request for configuration information; and receive data from the IoT device corresponding to a sensor on the IoT device operated using an application; a search engine to locate, using the unique identifier, the application to send to the IoT device; and a transmitter to send the application to the IoT device.

In Example 52, the subject matter of Example 51 optionally includes wherein to receive the indication includes the receiver to receive the indication over a licensed carrier band.

In Example 53, the subject matter of Example 52 optionally includes wherein the licensed carrier band is an IoT ultra-narrowband.

In Example 54, the subject matter of any one or more of Examples 51-53 optionally include wherein to locate the application includes the search engine to query a third-party network using the unique identifier.

In Example 55, the subject matter of any one or more of Examples 51-54 optionally include wherein the search engine is to locate a second application using the unique identifier and wherein the transmitter is to send the second application to the IoT device to replace the application.

In Example 56, the subject matter of Example 55 optionally includes wherein the transmitter is to send a set of behavioral rules to the device, the behavioral rules including at least one of a quality of service (QoS) level, a sleep schedule, and a communications mechanism.

In Example 57, the subject matter of Example 56 optionally includes wherein the behavioral rules include at least one of a network choice, security policy, diagnostic requirement, or rate plan.

In Example 58, the subject matter of any one or more of Examples 51-57 optionally include wherein to send the application to the IoT device includes the transmitter to send a library to run on the IoT device.

In Example 59, the subject matter of Example 58 optionally includes wherein the library includes a driver to control the sensor.

In Example 60, the subject matter of any one or more of Examples 51-59 optionally include wherein the transmitter is to forward the received data to a third-party network.

In Example 61, the subject matter of any one or more of Examples 51-60 optionally include audit circuitry to certify the IoT device prior to receiving the indication.

In Example 62, the subject matter of any one or more of Examples 51-61 optionally include wherein the sensor is not certified by the network carrier system.

Example 63 is a method for using a network carrier system, the method comprising: receiving, using a transceiver, an indication from a pre-certified Internet of Things (IoT) blank device, the indication including a unique identifier and a request for configuration information; locating, using a search engine, an application to send to the IoT device using the unique identifier; sending, using the transceiver, the application to the IoT device; and receiving, using the transceiver, data from the IoT device corresponding to a sensor on the IoT device operated using the application.

In Example 64, the subject matter of Example 63 optionally includes wherein receiving the indication includes receiving the indication over a licensed carrier band.

In Example 65, the subject matter of Example 64 optionally includes wherein the licensed carrier band is an IoT ultra-narrowband.

In Example 66, the subject matter of any one or more of Examples 63-65 optionally include wherein locating the application includes querying a third-party network using the unique identifier.

In Example 67, the subject matter of any one or more of Examples 63-66 optionally include locating a second application using the unique identifier and sending the second application to the IoT device to replace the application.

In Example 68, the subject matter of Example 67 optionally includes sending a set of behavioral rules to the device, the behavioral rules including at least one of a quality of service (QoS) level, a sleep schedule, and a communications mechanism.

In Example 69, the subject matter of Example 68 optionally includes wherein the behavioral rules include at least one of a network choice, security policy, diagnostic requirement, or rate plan.

In Example 70, the subject matter of any one or more of Examples 63-69 optionally include wherein sending the application to the IoT device includes sending a library to run on the IoT device.

In Example 71, the subject matter of Example 70 optionally includes wherein the library includes a driver to control the sensor.

In Example 72, the subject matter of any one or more of Examples 63-71 optionally include forwarding the received data to a third-party network.

In Example 73, the subject matter of any one or more of Examples 63-72 optionally include certifying the IoT device prior to receiving the indication.

In Example 74, the subject matter of any one or more of Examples 63-73 optionally include wherein the sensor is not certified by the network carrier system.

Example 75 is at least one machine-readable medium including instructions for operation of a computing system that, when executed by a machine, the machine to perform any of the methods of Examples 63-74.

Example 76 is an apparatus comprising means for performing any of the methods of Examples 63-74.

Example 77 is a system for using a network carrier system, the system comprising: means for receiving, using a transceiver, an indication from a pre-certified Internet of Things (IoT) blank device, the indication including a unique identifier and a request for configuration information; means for locating, using a search engine, an application to send to the IoT device using the unique identifier; means for sending, using the transceiver, the application to the IoT device; and means for receiving, using the transceiver, data from the IoT device corresponding to a sensor on the IoT device operated using the application.

In Example 78, the subject matter of Example 77 optionally includes wherein the means for receiving the indication include means for receiving the indication over a licensed carrier band.

In Example 79, the subject matter of Example 78 optionally includes wherein the licensed carrier band is an IoT ultra-narrowband.

In Example 80, the subject matter of any one or more of Examples 77-79 optionally include wherein the means for locating the application include means for querying a third-party network using the unique identifier.

In Example 81, the subject matter of any one or more of Examples 77-80 optionally include means for locating a second application using the unique identifier and means for sending the second application to the IoT device to replace the application.

In Example 82, the subject matter of Example 81 optionally includes means for sending a set of behavioral rules to the device, the behavioral rules including at least one of a quality of service (QoS) level, a sleep schedule, and a communications mechanism.

In Example 83, the subject matter of Example 82 optionally includes wherein the behavioral rules include at least one of a network choice, security policy, diagnostic requirement, or rate plan.

In Example 84, the subject matter of any one or more of Examples 77-83 optionally include wherein the means for sending the application to the IoT device include means for sending a library to run on the IoT device.

In Example 85, the subject matter of Example 84 optionally includes wherein the library includes a driver to control the sensor.

In Example 86, the subject matter of any one or more of Examples 77-85 optionally include means for forwarding the received data to a third-party network.

In Example 87, the subject matter of any one or more of Examples 77-86 optionally include means for certifying the IoT device prior to receiving the indication.

In Example 88, the subject matter of any one or more of Examples 77-87 optionally include wherein the sensor is not certified by the network carrier system.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A networking computing device, the device comprising:
   a processor;
   memory;
   a transceiver implemented by the processor to:
     receive and transmit data from an application running on the device; and
   a controller implemented by the processor to:
     test the device to determine whether the device requires a configuration by reading an initialization data value maintained in the memory, wherein a determination of whether the device requires configuration includes a determination that the device is in an uninitialized state;
     perform communication with a server, via the transceiver, in response to a determination that the device requires configuration, to retrieve configuration data, the communication including a message with an identifier of the device;
     receive the configuration data, the configuration data including the application and a library, the library including a device driver to interface with a hardware component of the device;
     install the configuration data, by performing an installation including:
       addition of the library to an operational environment of the device;
       registration of the application with a message component of the device that enforces isolation of the application from architecture of the device, wherein to enforce isolation from the architecture of the device, the application cannot communicate with the architecture of the device outside the message component; and
       registration of the library with the message component of the device to permit the application to interact with the hardware component connected to the device via the message component using the library; and
     run the application to complete the configuration of the device.

2. The device of claim 1, wherein the device includes a notification component, wherein the notification component is not accessible to the application, and wherein the notification component is configured to provide notifications to the server about a state of the device.

3. The device of claim 2, wherein the state of the device is at least one of: a hardware state, a kernel state, an operating system state, an application state, a management component state, a security circuitry state, a library state, a transceiver state, a certified state, or a server component state.

4. The device of claim 1, wherein the configuration of the device includes wiping the application from the device and reinstalling the application, and wherein wiping the application includes rolling the device back to a certified state.

5. The device of claim 1, wherein the configuration of the device includes installing an additional application on the device.

6. The device of claim 1, comprising a carrier component configured to:
receive the configuration from the server, the configuration specifying device components for upper-level carrier operation; and
configure an operating environment of the device to conform to the configuration.

7. The device of claim 6, wherein the carrier component is further configured to:
receive an update from the server; and
install the update.

8. The device of claim 1, wherein the communication with the server includes a request for configuration information.

9. The device of claim 1, wherein the communication with the server is sent over a licensed carrier band.

10. The device of claim 9, wherein the licensed carrier band is an ultra-narrowband.

11. The device of claim 1, wherein the transceiver is further configured to receive an additional application from the server, using the identifier.

12. A method for customizing a networking computing device, the method including:
testing the device to determine whether the device requires a configuration by reading an initialization data value maintained in memory on the device, wherein a determination of whether the device requires configuration includes a determination that the device is in an uninitialized state;
performing communication with a server, via a transceiver, in response to a determination that the device requires configuration, to retrieve configuration data, the communication including a message with an identifier of the device;
receiving the configuration data, the configuration data including an application and a library, the library including a device driver to interface with a hardware component of the device;
installing the configuration data, by performing an installation including:
addition of the library to an operational environment of the device;
registration of the application with a message component of the device that enforces isolation of the application from architecture of the device, wherein to enforce isolation from the architecture of the device, the application cannot communicate with the architecture of the device outside the message component; and
registration of the library with the message component of the device to permit the application to interact with the hardware component connected to the device via the message component using the library; and
running the application to complete the configuration of the device.

13. The method of claim 12, further comprising:
receiving the configuration from the server, the configuration specifying device components for upper-level carrier operation; and
configuring an operating environment of the device to conform to the configuration.

14. The method of claim 12, further comprising:
receiving an update from the server; and
installing the update.

15. The method of claim 12, further comprising:
providing notifications to the server about a state of the device.

16. The method of claim 15, wherein the state of the device is at least one of: a hardware state, a kernel state, an operating system state, an application state, a management component state, a security circuitry state, a library state, a transceiver state, a certified state, or a server component state.

17. The method of claim 12, further comprising:
receiving an additional application from the server, using the identifier.

18. The method of claim 12, wherein the configuration of the device includes wiping the application from the device and reinstalling the application, and wherein wiping the application includes rolling the device back to a certified state.

19. At least one non-transitory machine-readable medium including instructions for a networking computing device, the instructions, when executed by when executed by a processor of the networking computing device, cause the processor to perform operations to:
test the device to determine whether the device requires a configuration by reading an initialization data value maintained in memory, wherein a determination of whether the device requires configuration includes a determination that the device is in an uninitialized state;
perform communication with a server, via a transceiver, in response to a determination that the device requires configuration, to retrieve configuration data, the communication including a message with an identifier of the device;
receive the configuration data, the configuration data including an application and a library, the library including a device driver to interface with a hardware component of the device;
install the configuration data, by performing an installation including:
addition of the library to an operational environment of the device;
registration of the application with a message component of the device that enforces isolation of the application from architecture of the device, wherein to enforce isolation from the architecture of the device, the application cannot communicate with the architecture of the device outside the message component; and
registration of the library with the message component of the device to permit the application to interact with the hardware component connected to the device via the message component using the library; and
run the application to complete the configuration of the device.

20. The at least one non-transitory machine-readable medium of claim 19, wherein the instructions further cause the processor to:
   provide a notification to the server about a state of the device.

21. The at least one non-transitory machine-readable medium of claim 20, wherein the state of the device is at least one of: a hardware state, a kernel state, an operating system state, an application state, a management component state, a security circuitry state, a library state, a transceiver state, a certified state, or a server component state.

22. The at least one non-transitory machine-readable medium of claim 19, wherein to communicate with the server includes instructions to:
   send a request for configuration information.

23. The at least one non-transitory machine-readable medium of claim 19, including instructions to case the device further to:
   receive a second application from the server, using the identifier, to replace the application.

24. The at least one non-transitory machine-readable medium of claim 19, wherein the configuration of the device includes wiping the application from the device and reinstalling the application, and wherein wiping the application includes rolling the device back to a certified state.

25. The at least one non-transitory machine-readable medium of claim 19, wherein the configuration of the device includes installing an additional application on the device.

\* \* \* \* \*

UNITED STATES PATENT AND TRADEMARK OFFICE
CERTIFICATE OF CORRECTION

| | |
|---|---|
| PATENT NO. | : 10,809,995 B2 |
| APPLICATION NO. | : 16/390242 |
| DATED | : October 20, 2020 |
| INVENTOR(S) | : Hussein et al. |

It is certified that error appears in the above-identified patent and that said Letters Patent is hereby corrected as shown below:

In the Claims

In Column 24, Line 32, in Claim 19, delete "when executed by when executed by" and insert --when executed by-- therefor Signed and Sealed this
Sixteenth Day of February, 2021

Drew Hirshfeld
*Performing the Functions and Duties of the
Under Secretary of Commerce for Intellectual Property and
Director of the United States Patent and Trademark Office*